(12) United States Patent
Kirmse et al.

(10) Patent No.: US 9,363,634 B1
(45) Date of Patent: Jun. 7, 2016

(54) PROVIDING CONTEXT-RELEVANT INFORMATION TO USERS

(71) Applicant: GOOGLE INC., Mountain View, CA (US)

(72) Inventors: Andrew Kirmse, Redwood City, CA (US); Kenny J. Leftin, San Francisco, CA (US); Ivan Young Lee, Boulder, CO (US); Andrew T. Wansley, San Francisco, CA (US); Emanuel Taropa, San Jose, CA (US); Alec W. Berryman, Cambridge, MA (US); Yaxin Liu, San Jose, CA (US); Rajesh Venkataraman, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/883,181

(22) Filed: Oct. 14, 2015

Related U.S. Application Data

(63) Continuation of application No. 13/928,828, filed on Jun. 27, 2013, now Pat. No. 9,195,703.

(51) Int. Cl.
  *G06F 17/30* (2006.01)
  *H04W 4/02* (2009.01)
  *G06Q 10/02* (2012.01)
  *G06Q 50/00* (2012.01)

(52) U.S. Cl.
  CPC .......... *H04W 4/02* (2013.01); *G06F 17/30386* (2013.01); *G06Q 10/02* (2013.01); *G06Q 50/01* (2013.01)

(58) Field of Classification Search
  CPC .. G06F 17/30386; G06Q 10/02; G06Q 50/01; H04W 4/802
  USPC ........................................... 707/758
  See application file for complete search history.

(56) References Cited

U.S. PATENT DOCUMENTS

| | | | |
|---|---|---|---|
| 5,991,735 A | 11/1999 | Gerace | |
| 6,014,638 A * | 1/2000 | Burge | G06Q 30/02 405/27.1 |
| 6,317,718 B1 | 11/2001 | Fano | |
| 7,565,157 B1 | 7/2009 | Ortega et al. | |
| 7,644,121 B2 * | 1/2010 | Swanson | G06F 17/30864 379/112.01 |
| 7,698,422 B2 | 4/2010 | Vanderhook et al. | |

(Continued)

OTHER PUBLICATIONS

Mrabet, Yassine, et al., "Recognising Professional-Activity Groups and Web Usage Mining for Web Browsing Personalization", WI 2007, Fremont, CA, Nov. 2-5, 2007, pp. 719-722.*

(Continued)

*Primary Examiner* — Robert Stevens

(74) *Attorney, Agent, or Firm* — Fish & Richardson P.C.

(57) ABSTRACT

Methods, systems, and apparatus, including computer programs encoded on computer storage media, for predicting context-relevant information based on large-scale aggregations of data. One of the methods includes receiving a user context of a user, wherein the user context specifies a location of a user device being used by the user. Data that represents counts of websites visited by users matching the user context is obtained. Data that represents counts of websites visited by users in general is obtained. Using the obtained counts, one or more likely websites visited by users matching the user context more frequently than by users in general is determined. Information identifying the one or more likely websites in response to receiving the user context is provided.

30 Claims, 6 Drawing Sheets

(56) References Cited

U.S. PATENT DOCUMENTS

| | | | |
|---|---|---|---|
| 7,917,480 | B2 | 3/2011 | Dean et al. |
| 7,925,743 | B2 | 4/2011 | Neely et al. |
| 2006/0036593 | A1 | 2/2006 | Dean et al. |
| 2006/0053090 | A1* | 3/2006 | Cotter ............... G06F 17/30867 |
| 2007/0005419 | A1 | 1/2007 | Horvitz et al. |
| 2007/0233671 | A1 | 10/2007 | Oztekin et al. |
| 2008/0005071 | A1 | 1/2008 | Flake et al. |
| 2008/0201311 | A1* | 8/2008 | Ertugrul ............ G06F 17/30867 |
| 2009/0063268 | A1 | 3/2009 | Burgess et al. |
| 2009/0125321 | A1* | 5/2009 | Charlebois ............. G06Q 30/02 705/346 |
| 2009/0163183 | A1 | 6/2009 | O'Donoghue et al. |
| 2009/0299857 | A1 | 12/2009 | Brubaker |
| 2012/0290399 | A1 | 11/2012 | England et al. |
| 2012/0311465 | A1 | 12/2012 | Nealer et al. |
| 2013/0110505 | A1 | 5/2013 | Gruber et al. |
| 2013/0110515 | A1 | 5/2013 | Guzzoni et al. |
| 2013/0111348 | A1 | 5/2013 | Gruber et al. |
| 2013/0111487 | A1 | 5/2013 | Cheyer et al. |
| 2013/0117022 | A1 | 5/2013 | Chen et al. |
| 2014/0129942 | A1* | 5/2014 | Rathod ............ H04N 21/44222 715/720 |
| 2014/0278308 | A1 | 9/2014 | Liu et al. |
| 2014/0280952 | A1* | 9/2014 | Shear ..................... H04L 47/70 709/226 |

OTHER PUBLICATIONS

Yan, Tingxin, et al., "Fast App Launching for Mobile Devices Using Predictive User Context", MobiSys '12, Low Wood Bay, Lake District, UK, Jun. 25-29, 2012, pp. 113-126.*

Wu, Xiao, et al., "Real-Time Near-Duplicate Elimination for Web Video Search With Content and Context", IEEE Transactions on Multimedia, vol. 11, No. 2, Feb. 2009, pp. 196-207.*

Khungar, Sharat, et al., "A Context Based Storage for Ubiquitous Computing Applications", EUSAI 2004, Eindhoven, The Netherlands, Nov. 8-10, 2004, pp. 55-58.*

Barroso et al., "Web Search for a Planet: The Google Cluster Architecture," IEEE Mirco, Mar.-Apr. 2003, pp. 22-28.

Bennett, Paul N., et al., "Inferring and Using Location Metadata to Personalize Web Search", SIGIR '11, Beijing, China, Jul. 24-28, 2011 pp. 135-144.

Bilenko, Mikhail, et al., "Mining the Search Trails of Surfing Crowds: Identifying Relevant Websites from User Activity", WWW 2008, Beijing, China, Apr. 21-25, 2008, pp. 51-60.

Eirinaki, Magdalini, et al., "Web Mining for Web Personalization", ACM Transactions on Internet Technology, vol. 3, No. 1, Feb. 2003, pp. 1-27.

Liu, Jiahui, et al., "Personalized News Recommendation Based on Click Behavior", IUI '10, Hong Kong, China, Feb. 7-10, 2010, pp. 31-40.

Mobasher, Bamshad, et al., "Effective Personalization Based on Association Rule Discovery from Web Usage Data", WIDM 2001, Atlanta, GA, © 2001, pp. 9-15.

Mobasher, Bamshad, et al., "Integrating Web Usage and Content Mining for More Effective Personalization", EC-Web 2000, LNCS 1875, Springer-Verlag, Berlin, Germany, © 2000, pp. 165-176.

White, Ryen W., et al., "Predicting User Interests from Contextual Information", SIGIR '09, Boston, MA, Jul. 19-23, 2009, pp. 363-370.

* cited by examiner

PROVIDING CONTEXT-RELEVANT INFORMATION TO USERS

CROSS-REFERENCE TO RELATED APPLICATION

This application is a continuation of and claims priority to pending U.S. patent application Ser. No. 13/928,828, filed Jun. 27, 2013 and entitled "Providing Context-Relevant Information to Users". The entire disclosure of the prior application is hereby incorporated by reference.

BACKGROUND

This specification relates to computer-implemented techniques for predicting content that users will find interesting.

SUMMARY

This specification describes techniques for predicting content that users are likely to be find immediately interesting based on large-scale aggregations of data. Systems implementing these techniques can make useful content predictions for users.

In general, one innovative aspect of the subject matter described in this specification can be embodied in methods that include the actions of receiving a user context of a user, wherein the user context specifies a location of a user device being used by the user; obtaining data that represents counts of websites visited by users matching the user context; obtaining data that represents counts of websites visited by users in general; determining, from the obtained counts, one or more likely websites visited by users matching the user context more frequently than by users in general; and providing information identifying the one or more likely websites in response to receiving the user context.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Obtaining data that represents counts of websites visited by users matching the user context and counts of websites visited by users in general comprises obtaining user activity data organized into sessions, the user activity data representing user activities, each session including one or more user activities for a particular user, the sessions including sessions for multiple users. Determining, from the obtained counts, one or more likely websites visited by users matching the user context more frequently than by users in general comprises generating a session query from the user context; identifying matching sessions, the matching sessions each satisfying the session query; and identifying likely web sites visited by users in the matching sessions, likely web sites being web sites found in the matching sessions that satisfy the session query and occur in the matching sessions more frequently than in sessions in general. Each term represents a particular attribute of the user context. The actions include computing a signal for each activity found in the matching sessions that indicates a likelihood of the activity given a match to the session query input compared to the likelihood of the activity over all sessions. Computing the signal comprises a signal S that satisfies the equation:

$$S = \frac{\text{(count of matching sessions with the activity/number of matching sessions)}}{\text{(count of all sessions with the activity/number of sessions)}}$$

where the count of all sessions with the activity and number of sessions are determined with reference to a plurality of sessions. Receiving a user context of a user comprises receiving a user context from the user device associated with the user, and wherein providing information identifying the one or more likely websites in response to receiving the user context comprises providing links to the one or more of the one or more likely websites to the user device, wherein the links are not provided in a response to a search query from the user device. The user context specifies one or more of a language of the user, an interest of the user, a time of day, a date, a season, a home city of the user, a previous query issued by the user, a previous website visited by the user, or a future event. The actions include determining one or more second likely websites visited by users matching a second user context more frequently than by users in general, wherein the second user context specifies a second geographic location that is at least a threshold distance away from the location of a user device associated with the user; and modifying the one or more likely websites including filtering out one or more second likely websites from the one or more likely websites.

The subject matter described in this specification can be implemented in particular systems so as to realize one or more of the following advantages. A system can provide to a user in a particular location, in some cases without a user request, websites, or links to websites, that are visited by users in the particular location more frequently than by users in general. This allows a user to quickly find information he or she is seeking and allows the user to discover locally-interesting websites and points of interest without ever issuing a search query. The prediction that websites predicted will be immediately interesting by the system can be based on multiple aspects of a user's context, e.g., a time of day and interests of the user, as well as the user's location, thereby providing a context-aware system for the user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes, among other things, a user context based prediction system. Given a user context of a user, which includes a current location of the user, the system can predict what information the user will find relevant to the user's context, e.g., a link to a particular website. A user context is data that represents one or more current attributes of the user. The user context will generally include the user's geographic location, though the user context can include any appropriate user activity data, including recent user activity conducted by the user. For example, the user context can include a user's language, a user's home city or region, a current time of day, a date, a season, the user's interests, e.g., as provided by the user in a user profile, a previous query submitted by the user, or a previous website visited by the user, to name just a few examples. The user context can also include information about future public events, e.g. a widely known sporting event, and future user-specific events, e.g. an appointment in an electronic calendar program, an upcoming flight, hotel reservation, concert, movie, or other upcoming event.

In this specification, for an activity to be "context-relevant" means that the activity is more likely to be performed by users who match the user context than users in general. For example, a context-relevant website can be a website that the system has predicted to be visited by users near a particular location more often than by users in general. Thus, context-relevant information is information that users are likely to find interesting, useful, and timely.

In this specification, providing a context-relevant website means providing information sufficient for a user to access the website, e.g. a name of the website, a link to a webpage of the website, or other such information about the website. The system can also provide other types of context-relevant information. For example, the system can provide context-relevant information about real-world entities, e.g. nearby public transportation stations or museums, by providing information sufficient for a user to identify, and possibly locate, such real-world entities. For example, the system may provide a name of and walking directions to a nearby public transportation station.

A system can determine context-relevant activities in order to provide a user with information that the user will find useful without having to search for such information, e.g., without having to issue a query to a search engine. For example, if the user travels to a particular geographic location, the system can identify context-relevant websites for that particular geographic location and provide the context-relevant websites to the user without the user having to search for them. Rather, the context of the user alone is sufficient for the system to identify websites that are likely to be relevant to the user at that particular place and time.

Figure 1A:
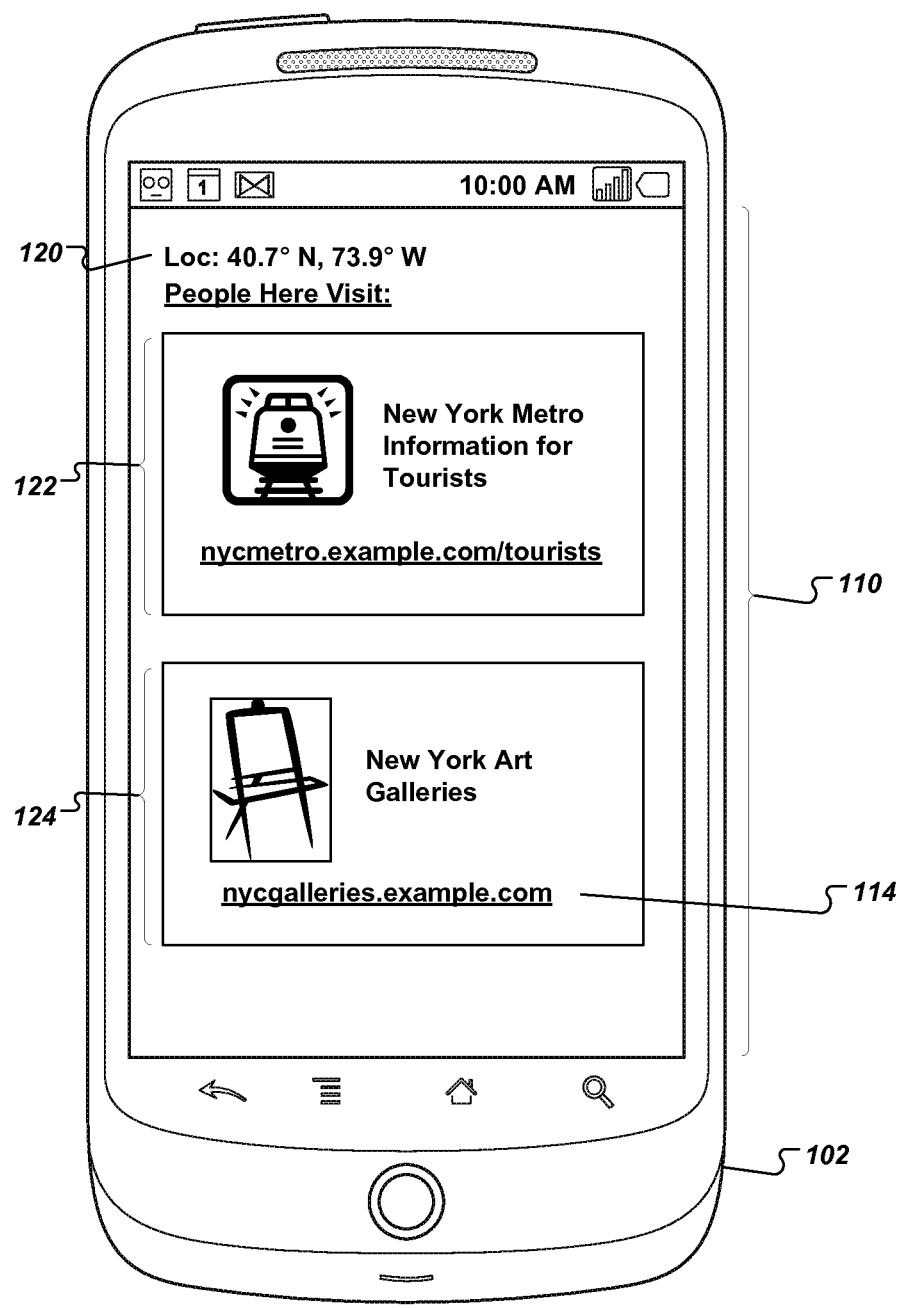
FIGS. 1A-C illustrate example user interfaces of a user application that obtains context-relevant websites.

FIG. 1A illustrates an example user interface 110 of a user application that obtains context-relevant websites. The user application is installed on a mobile user device 102. The user application provides context-relevant websites, e.g., by presenting links, to the user without requiring the user to perform a search for the websites. The user application can produce notifications or sounds to alert the user that context-relevant website identifiers are available. The user can also open the user application or select another option to trigger the user application to obtain context-relevant websites.

In example illustrated in FIG. 1A, the user's context includes a location 120 that is within New York City. The user's context also includes the user's home city, which is in California, and an interest of the user, which is an interest in art. The user application can provide the user's current context to a search system and can receive from the search system the website identifiers 122 and 124.

The website identifiers 122 and 124 include information about websites that the search system has determined to be relevant to the user's context, e.g. websites that are likely to be interesting or useful to the user. Each website identifier can include various types of information about the website, e.g., an icon, a description, a title, and a selectable website link 114. Selection of the website link 114 or the entire website identifier 122 can cause the user application, or a different user application, e.g., a web browser, to navigate to the corresponding website location. In this specification, a user selection includes any appropriate method for a user to select a user interface control element, e.g. a "click" using a mouse input device, voice input commands, touchscreen gesture inputs, just to name a few examples. For brevity, a user selection may be referred to as a "click."

In this example, website identifier 122 provides information about a website that is popular with tourists in New York. The search system can identify the website for the user not by an explicit determination that the user is not from New York, but rather form analyzing user activities of many users and determining that near the user's current location, users matching the user's context are likely to visit the website more often than are users in general.

The website identifier 124 provides information about a website on New York art galleries and can be identified by the system due to the user's interest in art included in the user's current context. In other words, the system has determined that users who are not New York residents, interested in art, and located in New York City are more likely to visit the art website than are users in general.

Figure 1B:
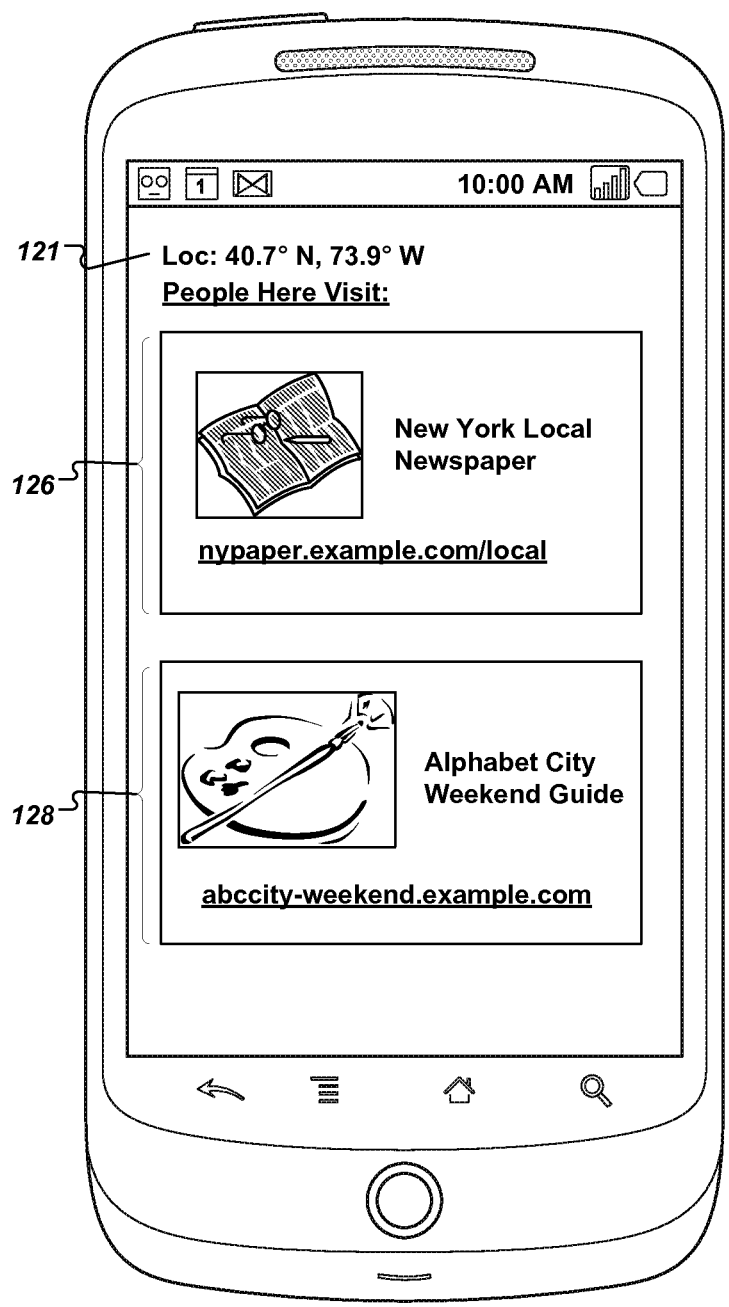

FIG. 1B illustrates another example user interface of the user application that obtains context-relevant websites. In this example, a different user is situated in the same location 121 as the user in the example from FIG. 1A, but the user's home city is New York. Therefore, the context-relevant websites determined by the system are likely to be different from the websites determined for a user whose home city is in California.

The user application obtains and presents the website identifiers 126 and 128 for websites that are relevant to the user's context. In this case, the website identifier 126 identifies a website of a local newspaper that is often visited by people who have New York as their home city. The website identifier 128 identifies a website of a weekend guide is that often visited by people living in a particular New York neighborhood.

Figure 1C:
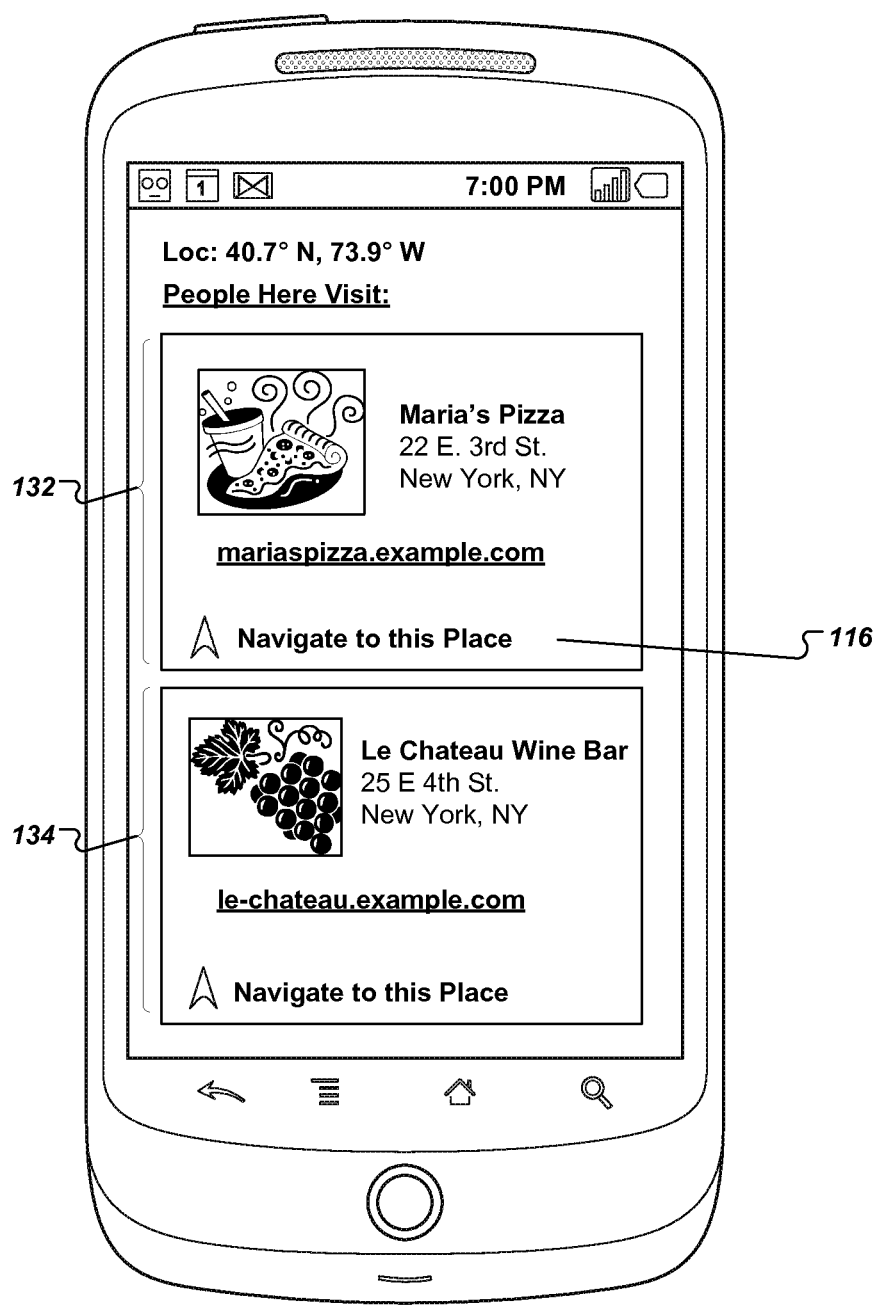

FIG. 1C illustrates another example user interface of the user application that obtains context-relevant websites. In this example, the tourist from California is in the same location as the example in FIG. 1A, but the time of day is now 7:00 p.m., rather than 10:00 a.m.

The user application obtains the website identifiers 132 and 134 for context-relevant websites. In this example, because the time of day is a time at which users are likely to search for restaurants, the context-relevant websites identify restaurants near the user's current location. In other words, the system has determined that users at this location are more likely to visit the restaurant websites than are users in general. The website identifiers 132 and 134 also include a selectable icon 116 that, when selected, causes the user device to open a navigation user application for navigating to the location of the restaurant identified.

The restaurant websites may also be context-relevant because they match an interest or a recent activity of the user.

For example, the user may have earlier in the day issued a search query for "pizza" and visited pizza-related websites. Thus, the search system has identified the website identifier 132 for the pizza restaurant not necessarily because the website is related to pizza or because it includes pizza-related keywords, but rather because large collections of aggregated user activity data indicate that the website that is likely to be visited by users near the location who recently searched for "pizza."

Similarly, the website identifier 134 may be identified as context-relevant based on the user's home city. In other words, the search system has determined that people from California are more likely to visit the website of the Le Chateau Wine Bar when located in New York City than are users in general. On the other hand, the search system may determine that a tourist from Texas is more likely to visit a website for a local barbecue restaurant in New York City than are users in general.

Figure 2:
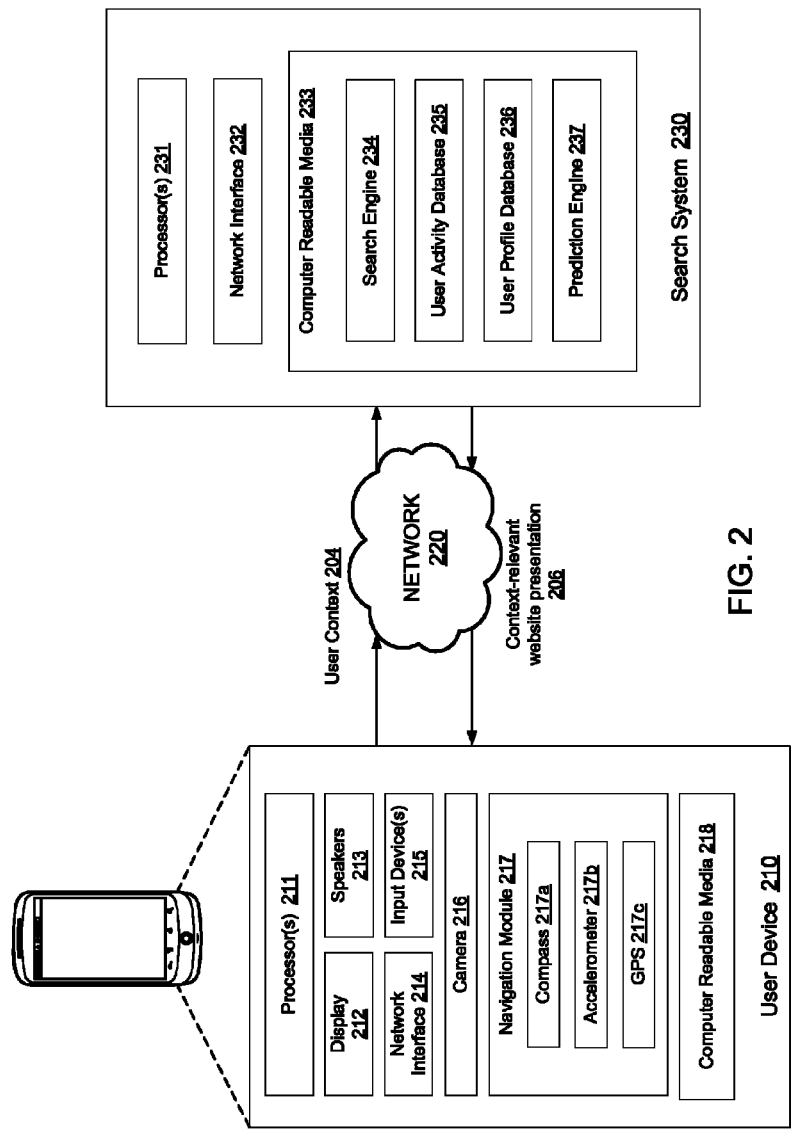
FIG. 2 is a diagram of an example system.

FIG. 2 is a diagram of an example system. The example system includes a user device 210, a network 220, and a search system 230. The user device 210 can communicate over network 220 to provide a user context 204 to the search system 230. The user device 210 then receives a presentation 206 of context-relevant websites from the search system 230 in response to the received user context 204.

A user device 110 may be a mobile phone, a portable music player, a tablet computer, a laptop computer, a PDA (Personal Digital Assistant), a smartphone, a smart wristwatch, or another handheld or wearable mobile device. The user device 210 can include one or more processors 211, one or more displays 212, one or more speakers 213, one or more input devices 215, a network interface 214, one or more cameras 216, a navigation module 217, and one or more computer-readable media 218. In other implementations, the user device 210 is not portable or mobile, but rather is a desktop or laptop computer or a server. In still other implementations, some of these structural elements are omitted or combined.

The display 212 may display video, graphics, images, and text that make up the user interface for the software applications used by the user device 210, and for the operating system programs used to operate the user device 210. Among the possible elements that may be displayed on the display 212 are various indicators, e.g., new mail, active phone call, data transmit/send, signal strength, battery life, and application icons, e.g., web browser, phone application, search application, contacts application, mapping application, email application. In one example implementation, the display 212 is a quarter video graphics array (QVGA) thin film transistor (TFT) liquid crystal display (LCD), capable of 16-bit or better color.

The one or more speakers 213 allow the user device 210 to convert an electrical signal into sound, such as a voice signal from another user generated by a telephone application program, or a ring tone signal generated from a ring tone application program.

The camera 216 allows the user device 210 to capture digital images, and may be a scanner, a digital still camera, a digital video camera, or other digital input device. In one example implementation, the camera 216a is a 12 megapixel (MP) or more camera.

The navigation module 217 includes a compass 271a, an accelerometer 217b, and a GPS (Global Positioning Satellite) receiver 217c. The GPS receiver 217c receives GPS signals in order to determine a current location. The compass 217a determines a direction pointed to by the orientation of user device 210. The accelerometer 217b may, for example, measure tilt, motion, or acceleration of the user device 210. The navigation module 217 may include other functionality, such as the ability to determine the location of the mobile device 210 using triangulation techniques based on WiFi signals and/or cellular tower signals.

The processor(s) 211 execute operating system or application program computer instructions for the user device 210. The input devices 215 may include, for example, a wireless keyboard. A keyboard may be used for entering text data and user commands into the user device 210.

The network 220 can include, for example, one or more of the Internet, a wireless local area network (WLAN) or WiFi network, a Third Generation (3G), Fourth Generation (4G), or other mobile telecommunications network, a wired Ethernet network, a private network such as an intranet, Wide Area Networks (WANs), Local Area Networks (LANs), analog or digital wired and wireless telephone networks, e.g., a PSTN, Integrated Services Digital Network (ISDN), and Digital Subscriber Line (xDSL), radio, television, cable, satellite, and/or any other delivery or tunneling mechanism for carrying data services, or any appropriate combination thereof. Networks may include multiple networks or subnetworks, each of which may include, for example, a wired or wireless data pathway.

The search system 230 may be implemented on one or more computers in one or more locations. The search system 230 may be connected to the network 220 and possibly to one or more other networks over the network interface 232. Similarly, the user device 210 may be connected to the network 220 and possibly to one or more other networks over the network interface 214 of the user device 210.

The processor(s) 231 execute operating system or application program computer instructions for the search system 230, and may be part of one or more computers in one or more locations that are coupled to each other through a network, e.g., network 220.

The computer-readable media 233 store and record information or data, and may be an optical storage medium, magnetic storage medium, flash memory, or any other storage medium type. The computer readable media 233 include software implementing a search engine 234, and a prediction engine 237, as well as a user activity database 235, and a user profile database 236.

The search engine 234 obtains web, image, or other search results that the search engine 234 identifies as being responsive to a query. The search engine 234 can, for example, identify web search results that each identify resources on the Internet using an index database that stores indexed resources, e.g., images, videos, or other types of content. the search system 230 can then provide a presentation 206 of context-relevant websites for presentation on the user device 210.

In operation, the search system 230 receives a user context 204 from the user device 210. The search system 230 uses a prediction engine 237 to obtain one or more websites that are relevant to the user context 204 and provides, to the user device 210, a presentation 206 of the context-relevant websites.

The user activity database 235 stores user activity data from a variety of search system 230 sources. Certain user activity data may be treated in one or more ways before it is stored or used, so that personally identifiable information is removed. The user activity data is from within a limited period of time.

An activity can be any action performed by a user, or on behalf of a user, on any interactive system of the search system 230 or in communication with the search system 230, e.g., a web search system, an image search system, a map system, an e-mail system, a social network system, a blogging system, a shopping system, just to name a few. An activity can also be an action directed to a user, e.g., a receipt of an e-mail message, or a higher level task. An activity can also be a status, e.g., that a user has an interest in film noir. The search system 230 stores user activities as user activity records, which include the time of day at which the corresponding activities occurred.

A user for which user activity data is stored may be a registered user of the system whose activities can for that reason be distinguished from the activities of other users. In some implementations, the user may be any distinguishable source of activity, whether or not a particular individual. In some implementations, a user may be distinguished by, e.g., signed-in user identifier; an anonymous cookie, which identifies a particular Web browser but not necessarily a particular individual; an IP (Internet Protocol) address, which identifies a particular source of traffic on a network, but not necessarily a particular browser or individual; or by some other identifying information. In some implementations, users may be distinguished by the IP addresses of the user devices used in performing the activities. In some implementations, a user or group of users may be distinguished from other users by reference to the IP address of the user devices used in performing the activities. Multiple individuals may share IP addresses, or the activity of one individual may come from multiple IP addresses over time. In some implementations, other techniques such as signed-in user identifiers or anonymous cookies may additionally be used to distinguish between sources of activity. In some implementations, activities are recorded by the interactive system involved in the activity. In some implementations, activity information is also, or alternatively, collected by an application, e.g., a web browser toolbar, running on the user's device.

A user action can be, for example, the submission of a particular query; the selection, in response to a particular query, of a particular search result, or of any search result; a visit, or a long visit, to a particular web site, page, or image; the viewing of a video; the submission of a request for directions to a point of interest; the receipt of a message confirming a hotel, flight, or restaurant reservation, or confirming purchase of a particular product or kind of product, or of a particular service or kind of service.

An activity record can include further information about the activity, for example, a location, a time of day, a day of week, a date, or a season of the activity, for example. The location can be obtained from a location obtained from a user device, e.g., the user device 210, that is used to interact with the search system or from a service provider, e.g., a mobile telephone network, or it can be inferred, for example, from an IP address of the user device. The location can be recorded in a generalized form using identifiers of one or more quadrilaterals in a predetermined geographic grid.

In some cases, activities can be associated with entities, in particular, with real world people, places, things, both tangible and intangible. For example, a search system could determine that a particular query is about a particular city, and the search system 230 could then associate a globally unique identifier for the city with the query in the activity record. Similarly, a shopping system or an e-mail system could determine that a user has purchased a particular product or service, associate that purchase with a particular entity and a unique identifier for the product or service entity, and include that information in the corresponding activity record. The entities associated with the activities of a user can be treated as likely interests of the user at the time of the activity.

The user profile database 236 stores user attributes about users of the search system 230. For example, the user profile database 236 can maintain profile information for registered users of the search system 230, for example, a preferred language or languages, a home city, a gender, an age, a marital status, or other user profile information provided by the user to the system or an affiliated system. Some interactive systems maintain data representing users' long term interests, for example, basketball, basket weaving, or classical music. If such long term interest information is available, the user attributes in the user profile database 236 can include such long term interests.

The prediction engine 237 aggregates activity data of individual users dynamically to produce correlations between various types of user activity data. For example, given a location, the prediction engine 237 can identify context-relevant websites that are visited more frequently by users who are near the location than by users in general. The prediction engine 237 can also produce other correlations concerning user interests, locations, specific products and/or services, ad clicks, news clicks, URL clicks, purchase information, and so on. The prediction engine can also use higher level annotations, e.g., the user seems to be involved in the "plan a trip to Tahiti" task, associated with lower level actions, e.g., the user has submitted searches directed to flights to, and hotels in, Tahiti. All of this combined data can then be indexed with a very large number of features to enable varied and extensive querying of the data to find useful correlations.

The activity records can be structured in any convenient form. In some implementations, the activity records are keyword-value pairs. Keywords can include, for example, keywords for the selection of a service, e.g., a search engine, a map service, a blog service, a social network service; keywords for the submission of a query or other request or a selection of content to the most recently selected service; keywords for the receipt of content from the most recently selected service; keywords for the viewing of particular content; keywords for tasks; or keywords for long term attributes. The values can include, for example, text strings, locally unique identifiers, or globally unique identifiers, e.g., entity identifiers obtained from a semantic knowledge base.

The prediction engine 237 can organize and index the user activity records in a variety of ways. For example, the system can build an index that maps geographic location identifiers, e.g., of quadrilaterals in a predetermined geographic grid, to a number of user activity records that each individually associated with each geographic location identifier, which can indicate, for example, that the user activity occurred near that geographic location. The system can thus use such an index to obtain one or more websites that were selected as search results while the user was near the geographic location in question.

The prediction engine 237 can also aggregate user activity records into activity sessions. In some implementations, the sessions are defined as non-overlapping periods of a fixed length, e.g., one, two, three, five, seven, or ten days, or as overlapping periods of fixed length, in which case some activities could appear in more than one session. Organizing the activity records into sessions allows the system to find correlations between user activities that indexing by individual user activities would not. For example, many users may perform an action near a particular location and then later on, e.g., an hour or a day later, may visit a website relevant to the particular geographic location. The prediction engine 237 could identify the later-visited websites as context-relevant websites, even though the visits to the websites did not actually occur when the user was near the particular location.

In some implementations, all sessions of all users are aligned to start and end on the same schedule. For convenience, the session may be said to "contain" activity records or, for brevity, to "contain" activities; similarly, an activity or an activity record may be said to be "found in" a session. In some implementations, each session is represented by a separate document that includes activity records, described below, as segments of text. Thus, according to context, the term "session" can also refer to the collected activity records assigned to a session, or a document representing the session.

The system can also assigns to each session activity records representing any higher level tasks that are associated with user actions that occurred during the time of the session, if higher level task information is available. For example, an interactive system may associate a higher level task with the occurrence of user activities of particular kinds within time windows of a predetermined length, which would be independent of length of sessions, described above. For example, when an interactive system sees a user submit multiple search queries naming vacation destinations, the interactive system may identify a "plan a vacation" task and associate it with each of the queries. If the queries are localized, a more specific task may be identified, e.g., "plan a vacation in Europe" or "plan a vacation in Italy." If such associated task information is available for activities in a session, the indexing system can associate the available task information with the session.

The system assigns to each session activity records representing any long term attributes of the user known to the system. Long term attributes can include, for example, a preferred language or languages, a home city, a gender, an age, a marital status, or other user profile information provided by the user to the system or affiliated system. Some interactive systems maintain data representing users' long term interests, for example, basketball, basket weaving, or classical music. If such long term interest information is available, the long term attributes can include such long term interests.

Each session can be represented as a collection of activity records. In some implementations, each session is represented as a chronological sequence of activity records. Those records having no associating time can be placed at any convenient place in the sequence, e.g., at the beginning of the sequence. The remaining records are placed in time order. The time assigned to a higher level task can be the time of the first action associated with the task.

The search system associates each user activity record or each session with a user identifier that is unique to each user that the system can distinctly identify. A particular small portion of this unique user identifier, e.g., 6, 8, 10, or 12 bits, is taken and mapped to set a single bit of a user key. The mapping can be done by hashing the small portion to a number that selects one bit of the user key, which the system sets. The user key is an m bit value, of which only one bit is set. The size m can be any value that is convenient in the underlying computer architecture, e.g., 32, 48, 64, 96, or 128. Thus, the user of each indexed user session is identified in the index by a user key that is shared by many other users.

The system can then index the activity records or sessions in an anonymized form. To protect user privacy, user activity record and session information is used by the prediction engine 237 only in its anonymized form. The index can be an inverted index, e.g., one in which there is a posting list for each term in an index dictionary. Each dictionary term can represent an activity, attribute, or any other feature of an activity record or session that may be useful. The posting list provides, for each dictionary term, a list of activity records or sessions in which the term appears, and optionally further information, e.g., where in the session the term appears, if the term has a specific location within a session.

After building the index, the prediction engine 237 can use one or more attributes of the received user context 204 to generate a session query. The prediction engine 237 can then search the index using the session query to obtain context-relevant websites that are likely to be visited by users at a location identified by the user context more frequently than by users in general. The system can then provide the context-relevant websites to a user device for presentation to the user.

While FIG. 2 illustrates an example system for obtaining context-relevant websites as described by this specification, other systems are possible. For instance, one or more of the functionalities described in association with the search system 230, above, may actually be performed by the user device 210, and vice versa. Furthermore, one or more modules, databases, and applications shown as being stored in media 233 may actually be stored in the media 218, and vice versa. Similarly, a user interface may be generated and displayed at the user device 210 using information received from the search system 230. Alternatively, the user interface may be generated at the search system 230, where the search system 230 transmits code, e.g., an HTML document, that, when rendered by the user device 210, causes the user device 210 to display the user interface.

Figure 3:
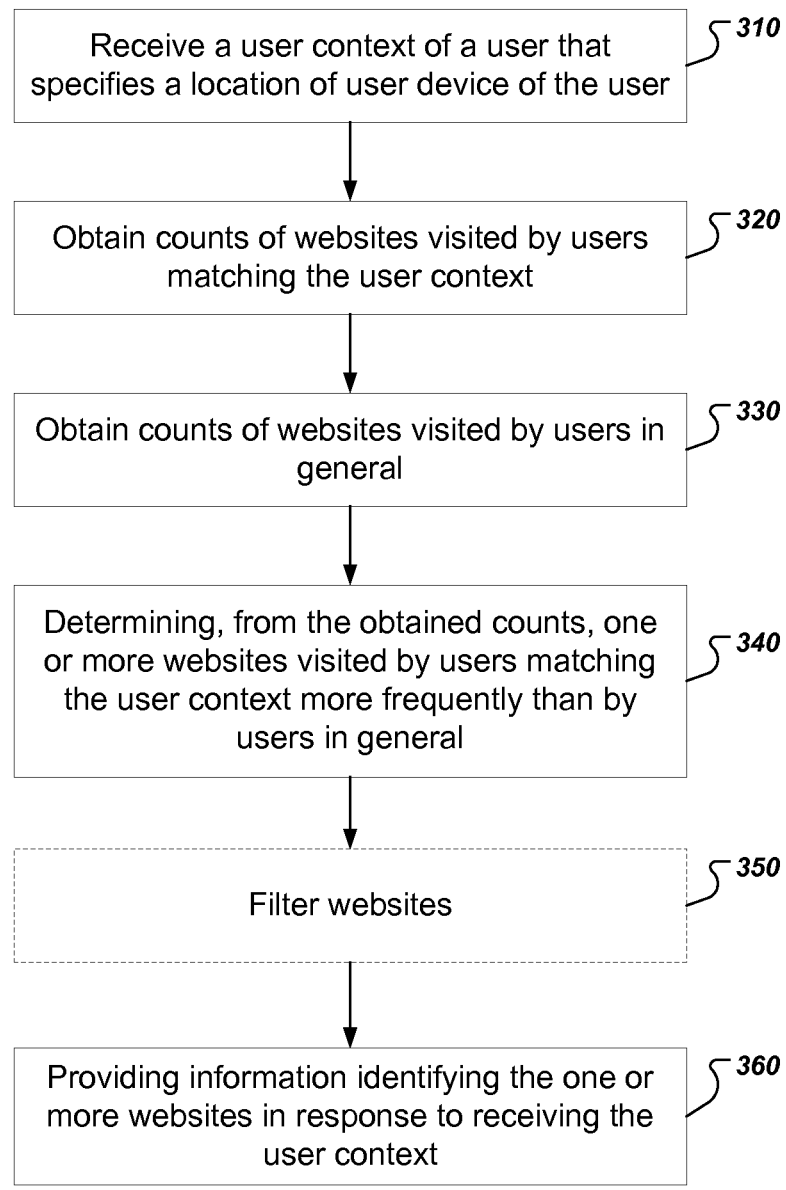
FIG. 3 is a flowchart of an example process for providing context-relevant websites to a user device.

FIG. 3 is a flowchart of an example process for providing context-relevant websites to a user device. In general, a prediction system receives a user context and identifies websites that are relevant to the user's context as those websites that are likely to be visited by other users matching the user context more frequently than by users in general. The system then provides the context-relevant websites to the user. The process can be performed by a computer system of one or more computers located in one or more locations. For convenience, the process will be described as being performed by a system of one or more computers, e.g., the prediction engine 234 of FIG. 2.

The system receives a user context of a user that includes a particular location of a user device associated with the user (310). In general, the receipt of a user context by the system will cause the system to search for context-relevant websites. All attributes of a user context need not be received at the same time. The system may obtain some attributes of the user context, e.g. a preferred language, sometime before the user arrives at a particular location.

Some attributes of the user context may be obtained dynamically from a user profile of the user with the system, for example, long-term interests and home city of the user. The user profile may also be associated with one or more services provided by the system, e.g. email, task, and calendar services. The system can obtain additional attributes of the user context, e.g. information describing future events, from such services associated with the user profile.

Other attributes may be obtained from recent activity of the user, e.g., a query recently submitted by the user, e.g., within the last hour, day, or week. The user context data can be generated by the user device, the system, or some combination of the two.

The geographic location can be determined by a mobile user device in possession of the user, e.g., a smartphone. The user device can periodically determine the location of the user device and send the location to the system over a network as a request for context-relevant websites. In some implementations, the user device sends the location to the search system only when near, e.g., within a threshold distance of, a particular point of interest. Alternatively, the user device can periodically send the location to the system, and the system may only provide context-relevant websites when the system determines that the user device is near a particular point of interest. For example, the system may receive a location of the user device and determine that the user device is near the Statue of Liberty. In response, the system can identify and send context-relevant websites to the user device for presentation to the user. For example, the system may identify a website of the Statue of Liberty ticket office as a context-relevant website when the user is near the Statue of Liberty and may therefore send data identifying the ticket office website to the user device for presentation to the user.

The system obtains data representing counts of websites visited by users matching the user context (320). The system can access a user activity database that contains data representing user activity data of users' interactions with a search engine. For example, the user activity database can record queries received by users and their respective user contexts, search results provided in response to the queries, and search results selected by users. In other words, each search result selection will be associated with a user context that defines one or more attributes of user activity data. The system can then count user selections of search results for users having a context that matches the received user context.

The system can consider a context associated with a particular user selection to be a matching context if one or more individual attributes between the contexts match. The system need not require all attributes of the contexts match. In some implementations, the system considers contexts to match if the geographic location identifier attributes match.

The determination of whether individual attributes match can depend on an attribute type. For example, the system can consider two geographic location attributes to be matching if the geographic locations are within a particular threshold distance of one another. Alternatively, the system can consider two geographic location attributes to be matching if they are both within the same geographic region, e.g., within the same city, county, state, or country, or within the same grid cell of a predetermined arrangement of grid cells. As another example, the system can consider two user interests to match if they are in a same user interest category, e.g., users' demonstrated interests in basketball and surfing can be considered to match because they are both in a same "sports" interest category.

The system may also consider particular user activity attributes to be matching if performed within a same time period as the associated search result selection. For example, for a previous query attribute, the system can consider previous queries submitted within a particular time period, e.g., within two days, of the selected search result.

The system may also impose attribute-specific time constraints to consider a selection to be matching. For example, for a future event attribute of the user context, e.g. an upcoming concert, the system can consider a context matching if the selection occurs before the future event occurs, e.g. before the flight departs. For travel-related attributes, e.g. an upcoming flight, the system can require that a selection occur after arrival at a particular location, e.g. after a flight arrives, for the context to be considered matching.

The system obtains data representing counts of websites visited by users in general (330). The system will generally compare the websites visited by users with matching contexts to websites visited generally to identify context-relevant websites. Thus, the system can access a user activity database to compute counts of websites visited by users generally. In some implementations, the system computes general user visit counts only for websites already identified as being visited by users having a matching context.

The system determines, from the obtained counts, one or more websites that are visited by users matching the user context more frequently than by users in general (340). In general, for each website the system will compare a frequency that each website was visited by users having a matching context to a frequency that each website was visited by users overall.

The system can compute a first frequency that a website was visited by users having a matching user context by computing how often users having a particular context visited the website. For example, the system can compare how often a user had a particular context and selected a website to how often a user had a particular context and did not select the website. A high first frequency is an indicator that the website is popular among users around the user's current location.

The system can compute a second frequency that a website was visited by users generally. For example, the system can compare how often users selected the website to how often users selected websites in general. A high second frequency is an indicator that the website is a generally popular website.

The system can then compare the first frequency to the second frequency. A high first frequency and a low second frequency indicates that users are more likely to visit the website when located near the particular location than users generally. On the other hand, a high second frequency indicates that the website is probably popular over large geographic regions, and is therefore probably less useful to a user seeing context-relevant websites.

In some implementations, a signal S that is based on the first frequency F1 and the second frequency F2 satisfies the following equation.

$$S = \frac{F1}{F2}$$

The system can consider websites with a score S satisfying a threshold to be context-relevant websites. An example technique for identifying websites that are visited by users matching a user context more frequently than by users in general is described in more detail below with reference to FIG. 4.

The system optionally filters the websites (350). In some implementations, the system can perform one or more filtering operations on an initial list of context-relevant websites. For example, the system can maintain a blacklist of websites that are generally popular over large geographic regions. The system can then remove any blacklisted websites from the list of context-relevant websites. In some implementations, the system filters websites by demoting the score for the websites rather than removing them completely from the set of context-relevant websites.

The system can also filter out websites that are context-relevant in other geographic locations or regions. For example, the system can determine one or more context-relevant websites for a second geographic location that is located a particular distance away from the user's current location, for example, by repeating the counting and determination of context-relevant websites for the second geographic location. The system can then filter out any websites that occur in both sets of context-relevant websites.

The system can also filter out websites that are context-relevant for a larger region that includes the user's particular geographic location. For example, the system can determine websites that are context-relevant for an entire city. The system can then filter out those websites, thus leaving websites that are context-relevant only for the user's current location.

The system can also filter websites by taxonomy. The system can maintain a website taxonomy that classifies websites. Certain websites may be uninteresting or unhelpful to a user in a particular user context. Thus, the system may filter out websites that are classified as belonging to a particular classification according to the website taxonomy. For example, the system could filter out websites that are classified as sports websites.

The system provides the one or more websites in response to receiving the user context (360). The system can for example provide the one or more likely websites to a user device for presentation to the user, for example, as illustrated in FIGS. 1A-C.

Figure 4:
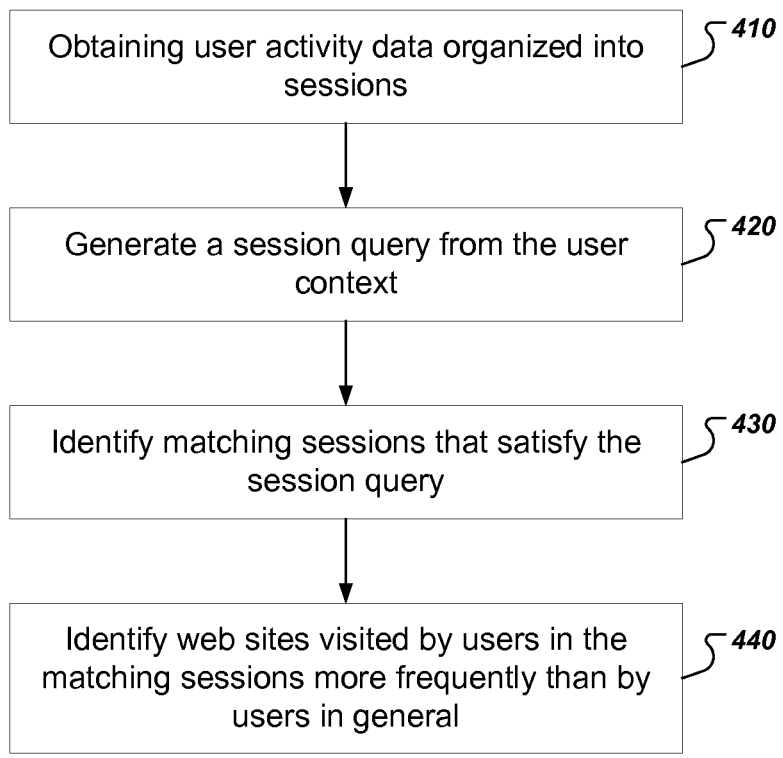
FIG. 4 is a flowchart of an example process for identifying context-relevant websites.

FIG. 4 is a flowchart of an example process for identifying context-relevant websites. The process generally determines websites that are visited by users matching a user context more frequently than by users in general. The operations of the example process described in FIG. 4 can be performed by a general purpose prediction engine, an example of which is described in commonly-owned U.S. patent application Ser. No. 13/928,939, for "Generalized Engine For Predicting Actions", to Jeffrey A. Dean, which is incorporated here by reference.

The system obtains user activity data organized into sessions (410). For example, the system can access an index of user sessions. As described above, each session includes one or more user activity records describing the actions of a particular user during a particular time period.

The system generates a session query from the user context (420). The session query specifies user context attributes of matching sessions, including a desired user activity to be found in the matching sessions. For example, the session query can specify a user context including a particular location, an interest of the user, and the home city of a user. The session query can also the type of user activity to be found, e.g., context-related websites in the matching sessions.

The sessions can be indexed according to a dictionary of terms, where each term represents a particular attribute of a user context. Thus, the system can generate a session query by generating a term corresponding to each attribute of the user's context.

The system can also generate session queries that request data other than context-related websites. For example, a session query can request context-related entity information to find entities identified in matching sessions. Context-related entities are entities that users matching the user context have selected from an entity database more frequently than users in general.

A session query can also request context-related queries to find queries that are issued by users matching the user context more frequently than users in general. The system can then provide the context-related queries to the user device as a suggested query completion. The system may also obtain and provide one or more search results that are responsive to a context-related query identified from the session query.

The system identifies matching sessions that satisfy the session query (430). The system identifies sessions that match the user context by identifying sessions that include terms that correspond to the session query.

The system identifies web sites that are visited by users in the matching sessions more frequently than users in general (440). The system can compute a first frequency that represents how often the requested activity occurred in matching sessions. For example, the system can determine how often a particular website visit occurred in the matching sessions.

The system can compute a second frequency that represents how often the activity occurs in sessions generally. For example, the system can determine how often a particular website occurred in all sessions.

In some implementations, a signal S satisfies the following equation.

$$S = \frac{\text{(count of matching sessions with the activity/number of matching sessions)}}{\text{(count of all sessions with the activity/number of sessions)}}$$

The value S is used to determine which activities are returned by the process, i.e., which activities are identified in a response. In some implementations, only if S exceeds a threshold value is the activity identified in a response by the process. A higher value of S indicates a higher likelihood of the activity in question given a match to the session query input, compared to the likelihood of the activity over all sessions. In some cases, for rare activities, for example, if the activity occurred once in the sessions and is in a matching session, S will have a large value that may be spurious. In some implementations, such cases are handled as special cases; for example, the process can require that an activity occur a predetermined minimum number of times if it is to be included in a response. In some implementations, the value of S must be in a predetermined range of values for the activity to be identified in a response by the process, to reduce the likelihood of returning questionable activities. The threshold value or values of S can be selected empirically to limited the activities returned by the process to activities that are highly correlated—i.e., correlated to a high, desired degree of correlation—with the conditions specified by the session query.

Similarly, the system can require that a minimum threshold number of matching sessions be present before data from the corresponding activity is returned in a response. Such steps would be taken to reduce the risk of information leaks arising from the use of data from too small a number of distinct users or too small a number of distinct sessions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages, and it can be deployed in any form, including as a stand-alone program or as a module, component, subroutine, or other unit suitable for use in a computing environment. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. Generally, a computer will also include, or be operatively coupled to, one or more mass storage devices for storing data, e.g., magnetic, magneto-optical, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving a user context of a user, wherein the user context specifies a location of a user device being used by the user;
   obtaining user activity data organized into sessions, each session being data representing a plurality of user activities performed by a distinct user during a respective time period, the sessions including sessions for multiple users;
   obtaining matching sessions for the received user context, each matching session being a distinct session that includes data representing activities performed by respective users having a user context matching the received user context during a time period represented by the matching session;
   obtaining general sessions, each general session including data representing activities performed by respective users during a time period represented by the general session;
   determining, from the obtained matching sessions and the obtained general sessions, one or more context-relevant activities that occur in the matching sessions more frequently than the one or more context-relevant activities occur in the general sessions, the one or more context-relevant activities being activities performed by users matching the received user context more frequently than by users in general; and providing information related to the one or more context-relevant activities in response to receiving the user context.

2. The method of claim 1, wherein the context-relevant activities comprise users accessing information about real-world entities, and wherein providing information related to the one or more context-relevant activities comprises providing information about the one or more real-world entities.

3. The method of claim 1, wherein the context-relevant activities comprise users making a restaurant reservation at a particular restaurant, and wherein providing information related to the one or more context-relevant activities comprises providing information about the particular restaurant.

4. The method of claim 1, wherein the context-relevant activities comprise users making a purchase at a particular business, and wherein providing information related to the one or more context-relevant activities comprises providing information about the particular business.

5. The method of claim 1, wherein the context-relevant activities comprise users visiting a particular restaurant, and wherein providing information related to the one or more context-relevant activities comprises providing information about the particular restaurant.

6. The method of claim 1, wherein the context-relevant activities comprise users issuing search queries for one or more restaurants, and wherein providing information related to the one or more context-relevant activities comprises providing information about the one or more restaurants.

7. The method of claim 1, wherein the context-relevant activities comprise users submitting social network site posts, and wherein providing information related to the one or more context-relevant activities comprises providing content from the one or more social network site posts.

8. The method of claim 1, wherein the user context includes one or more interests of the user.

9. The method of claim 1, wherein the user context includes a home geographic location associated with the user.

10. The method of claim 1, wherein receiving the user context of a user comprises receiving a user context from a user device associated with the user, and wherein providing information related to the one or more context-relevant activities in response to receiving the user context comprises providing the information to the user device, and wherein the information is not provided to the user device in a response to a search query received from the user device.

11. A system comprising:

one or more computers and one or more storage devices storing instructions that are operable, when executed by the one or more computers, to cause the one or more computers to perform operations comprising:

receiving a user context of a user, wherein the user context specifies a location of a user device being used by the user;

obtaining user activity data organized into sessions, each session being data representing a plurality of user activities performed by a distinct user during a respective time period, the sessions including sessions for multiple users;

obtaining matching sessions for the received user context, each matching session being a distinct session that includes data representing activities performed by respective users having a user context matching the received user context during a time period represented by the matching session;

obtaining general sessions, each general session including data representing activities performed by respective users during a time period represented by the general session;

determining, from the obtained matching sessions and the obtained general sessions, one or more context-relevant activities that occur in the matching sessions more frequently than the one or more context-relevant activities occur in the general sessions, the one or more context-relevant activities being activities performed by users matching the received user context more frequently than by users in general; and providing information related to the one or more context-relevant activities in response to receiving the user context.

12. The system of claim 11, wherein the context-relevant activities comprise users accessing information about real-world entities, and wherein providing information related to the one or more context-relevant activities comprises providing information about the one or more real-world entities.

13. The system of claim 11, wherein the context-relevant activities comprise users making a restaurant reservation at a particular restaurant, and wherein providing information related to the one or more context-relevant activities comprises providing information about the particular restaurant.

14. The system of claim 11, wherein the context-relevant activities comprise users making a purchase at a particular business, and wherein providing information related to the one or more context-relevant activities comprises providing information about the particular business.

15. The system of claim 11, wherein the context-relevant activities comprise users visiting a particular restaurant, and wherein providing information related to the one or more context-relevant activities comprises providing information about the particular restaurant.

16. The system of claim 11, wherein the context-relevant activities comprise users issuing search queries for one or more restaurants, and wherein providing information related to the one or more context-relevant activities comprises providing information about the one or more restaurants.

17. The system of claim 11, wherein the context-relevant activities comprise users submitting social network site posts, and wherein providing information related to the one or more context-relevant activities comprises providing content from the one or more social network site posts.

18. The system of claim 11, wherein the user context includes one or more interests of the user.

19. The system of claim 11, wherein the user context includes a home geographic location associated with the user.

20. The system of claim 11, wherein receiving the user context of a user comprises receiving a user context from a user device associated with the user, and wherein providing information related to the one or more context-relevant activities in response to receiving the user context comprises providing the information to the user device, and wherein the information is not provided to the user device in a response to a search query received from the user device.

21. A computer program product, encoded on one or more non-transitory computer storage media, comprising instructions that when executed by one or more computers cause the one or more computers to perform operations comprising:

receiving a user context of a user, wherein the user context specifies a location of a user device being used by the user;

obtaining user activity data organized into sessions, each session being data representing a plurality of user activities performed by a distinct user during a respective time period, the sessions including sessions for multiple users;

obtaining matching sessions for the received user context, each matching session being a distinct session that includes data representing activities performed by respective users having a user context matching the received user context during a time period represented by the matching session;

obtaining general sessions, each general session including data representing activities performed by respective users during a time period represented by the general session;

determining, from the obtained matching sessions and the obtained general sessions, one or more context-relevant activities that occur in the matching sessions more frequently than the one or more context-relevant activities occur in the general sessions, the one or more context-relevant activities being activities performed by users matching the received user context more frequently than by users in general; and providing information related to the one or more context-relevant activities in response to receiving the user context.

22. The computer program product of claim 21, wherein the context-relevant activities comprise users accessing information about real-world entities, and wherein providing information related to the one or more context-relevant activities comprises providing information about the one or more real-world entities.

23. The computer program product of claim 21, wherein the context-relevant activities comprise users making a restaurant reservation at a particular restaurant, and wherein providing information related to the one or more context-relevant activities comprises providing information about the particular restaurant.

24. The computer program product of claim 21, wherein the context-relevant activities comprise users making a purchase at a particular business, and wherein providing information related to the one or more context-relevant activities comprises providing information about the particular business.

25. The computer program product of claim 21, wherein the context-relevant activities comprise users visiting a particular restaurant, and wherein providing information related to the one or more context-relevant activities comprises providing information about the particular restaurant.

26. The computer program product of claim 21, wherein the context-relevant activities comprise users issuing search queries for one or more restaurants, and wherein providing information related to the one or more context-relevant activities comprises providing information about the one or more restaurants.

27. The computer program product of claim 21, wherein the context-relevant activities comprise users submitting social network site posts, and wherein providing information related to the one or more context-relevant activities comprises providing content from the one or more social network site posts.

28. The computer program product of claim 21, wherein the user context includes one or more interests of the user.

29. The computer program product of claim 21, wherein the user context includes a home geographic location associated with the user.

30. The computer program product of claim 21, wherein receiving the user context of a user comprises receiving a user context from a user device associated with the user, and wherein providing information related to the one or more context-relevant activities in response to receiving the user context comprises providing the information to the user device, and wherein the information is not provided to the user device in a response to a search query received from the user device.

* * * * *